United States Patent
Kenyon et al.

(10) Patent No.: US 6,604,113 B1
(45) Date of Patent: Aug. 5, 2003

(54) METHOD AND APPARATUS FOR PROVIDING ACCOUNT INFORMATION

(75) Inventors: Jeffrey D. Kenyon, Boulder, CO (US); Peter L. Briggs, Littleton, CO (US); Linda M. Kunzweiler, Denver, CO (US); Jonathan S. Simon, Seattle, WA (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/549,851

(22) Filed: Apr. 14, 2000

(51) Int. Cl.[7] .............................................. G06F 17/30
(52) U.S. Cl. ........................ 707/104.1; 707/9; 705/36; 379/114.01
(58) Field of Search .............................. 707/104.1, 516, 707/2, 9, 10, 100; 379/114.01; 706/11, 45, 47, 60; 705/34, 35, 36, 37, 38

(56) References Cited

U.S. PATENT DOCUMENTS

| | | | |
|---|---|---|---|
| 5,590,250 A | 12/1996 | Lamping et al. | 345/427 |
| 5,619,632 A | 4/1997 | Lamping et al. | 345/441 |
| 5,822,410 A | * 10/1998 | McCausland et al. | 379/114.01 |
| 5,903,879 A | * 5/1999 | Mitchell | 705/38 |
| 5,940,843 A | * 8/1999 | Zucknovich et al. | 707/516 |
| 6,078,904 A | * 6/2000 | Rebane | 705/36 |

* cited by examiner

*Primary Examiner*—Shahid Alam
(74) *Attorney, Agent, or Firm*—Marsh Fischmann & Breyfogle LLP (57) ABSTRACT

A system provides for the automatic generation of information portfolios for a selected entity. A corporate data warehouse may include information about particular customers in various data tables. This information may be advantageous to sales representatives for presenting to customers and identifying those accounts for a customer which may benefit from additional services or equipment. The system described herein performs a periodic automatic search of the corporate data warehouse and extracts selected information for a particular customer and combines this information into a single portfolio which is organized in a predetermined format. This portfolio may be stored on a local network server with which a system user may establish a connection in order to download said portfolio. This portfolio may be organized in such a fashion that thousands of different entities for a particular organization may be identified and the information is easily accessed and viewed.

12 Claims, 12 Drawing Sheets

METHOD AND APPARATUS FOR PROVIDING ACCOUNT INFORMATION

FIELD OF THE INVENTION

The present invention relates to a database access system, and more specifically to a system which allows for the remote download, organization and presentation of information for a particular entity.

BACKGROUND OF THE INVENTION

Many companies which provide a large variety of services and products to a large customer base maintain extensive records about their customers in a centralized database. As an example, a telecommunications company which provides telephony services may maintain many different types of information about their customers. These types of information may include ordering and billing information for services provided, current contracts with customers, types of services a customer may use, as well as trouble tickets or service calls made to a particular customer.

As mentioned above, this information may be stored in a centralized database. The different types of information may be located in different tables within the database with a reference in the entry to the particular customer. In this scenario, specific information for a particular customer may be retrieved by individually accessing each table and manually compiling the information.

One party which may employ the information stored in the centralized database for a variety of purposes are the account representatives for the company. Account representatives generally spend their time in the field selling products and services rather than working out of an office. These representatives make frequent visits to their customers and may try to either sell additional products or services, or handle any customer needs or complaints which may exist. In order to better service their customers, the account representatives may require many different types of information about their customers. In many cases, these account representatives are issued laptop computers to facilitate mobile work, however, the data about their customers and about the services provided by the company resides in the company's corporate data war use. Accessing this data requires a network connection, and retrieving the relevant data requires some technical skill which not all account representatives may possess. Further, once this data is retrieved, further work must be performed by the representative to organize it in a fashion which is presentable to a customer.

SUMMARY OF THE INVENTION

The inventors have recognized that it would be advantageous to provide a system for account representatives and other parties which provides access to the most updated information in a centralized database, and presents it in an organized, custom-made format. Further, it would be desirable for this type of custom information to be automatically generated on a periodic basis and made available such that it may be downloaded and viewed on a computing device which is remotely located from the database in which the customer information is stored.

According to the invention described herein, a data access system is disclosed which includes a centralized location to which a remotely located computing device may connect. The centralized location may provide access to a first database which contains information stored according to a known organizational structure. In particular, the database may include multiple tables which are organized in a topical manner. The system may also provide access to a second application-specific database which includes account information with regard to the entities for which information is stored in the first database. The information in the second database may relate to locations for stored information, as well as parties which may have access to the information.

Also included in the system may be a portfolio generator which is configured to perform searches of the databases to locate particular types of information and then assemble this retrieved information into a predetermined format. The portfolio generator may employ information stored in the second database as well as a rules repository in order to locate and organize information which is located and retrieved from the first database. An external interface may also be provided such that the connection may be established to a remotely located computing device such that information generated by the portfolio generator may be accessed and downloaded.

The system described herein may be implemented on a computing device such as a network server. The server configuration would provide for connections to be established either over a data network such as the Internet, or via the telephone lines through a public switch telephone network (PSTN). A party with a laptop computer may, through use of a modem, establish a connection with an Internet Service Provider which in turn provides for a connection to be established to the network server. Communications may be facilitated through use of a web browser. Conversely, the system user may use the modem in the personal computer to directly dial up the network server and transmit and receive data signals over that network.

As was described above, the network server either has resident upon it, or is in connection with, a first and second database. In one aspect of the invention, the first database may contain a plurality of types of information with regards to the operation of a business. The database is organized such that, for example, one segment of the database may contain billing and identification information while another section may contain information with regards to the provision of services, (i.e., trouble tickets, complaints, service visits, etc.).

The second database may contain specific information with regards to the generation of portfolio information for a particular customer or client. In particular, this information may include accounts which are to be profiled, users which have access to a particular account, and account modules to which a particular user may have access. Further, this database may include information with regards to the types of information to be retrieved from the database for a particular account.

Further, with regards to the present system, a rules repository may be provided which may be used to identify particular characteristics of the data which has been included in a portfolio for a particular account. For example, the rules may designate that a search be performed to determine if a particular customer is receiving a particular type of service, or whether any other additional services or products may be provided.

The portfolio generator may be configured such that searches are periodically performed on the first database to locate and retrieve information for a particular customer. Once this information is retrieved it is organized in a file according to a predetermined format. One format which may be used is presenting the information as part of a hyperbolic tree. In an example where the business is a telecommunications business which provides telephone service, the data may be organized according to geographic area. For example, in the hyperbolic tree, nodes may be established for each state, and then connecting nodes provided for each city. Connections may be further established to individual addresses in those cities which receive telecommunications services from the service provider. As each level in the hyperbolic tree is selected, associated textual information may also be displayed.

The system described herein may further include a network interface which provides for accessing and downloading portfolios. The connection may be established with a remote computing device such as a laptop computer. A web browser may be installed upon the computer which provides for the viewing, manipulation, and presentation of customer information included in a particular portfolio. Certain security measures may be instituted with the interface to limit access to the portfolios.

In operation, the portfolio generator is configured to periodically identify accounts for which portfolios are to be generated. A listing of these accounts may be provided in the second database. Depending on the type of business for which the data is being stored, this may be done as frequently or infrequently as desired. In order to generate a portfolio for a particular customer, a search is performed of the first database which, as described above, includes a plurality of different data tables which contain information with regards to a particular entity. Each time a periodic search is performed, a number of tables in the first database are searched to locate and retrieve specific information about the entity for which the portfolio is being generated. Once this information is gathered, additional processes may be performed upon the information to provide an output file formatted in a desired fashion. These processes may include such things as performing calculations on numbers included in the data or formatting the data in a manner which may provide for its visual presentation.

Once the portfolio is generated, it is stored on a file server which is accessible by parties establishing a remote connection. In order to download a portfolio, a system user may establish a connection over a data network, such as the Internet, with the local server upon which the portfolio is located. When a connection is established with the server, access information may be retrieved. This information is employed to determine which parties have authorized access to retrieve particular portfolios. The system may require that a party who has established a remote connection with the local server enter particular identifying information for gaining access, such as a user name, or a password.

Once the party trying to gain access provides the necessary information, the portfolio may be accessed and downloaded over the data network. At this point, using a local web browser, the party may view the portfolio in the format which it was created.

Also during a connection, a user may provide further programming information for the creation of portfolios. As was described above, in order to create a portfolio, a search is performed of a central database to locate information in a number of tables for a particular customer. While a user is logged on to the server, the instructions for the search may be updated such that additional search items are either added or removed. Further, a user may provide additional rules which are employed to search the portfolios and identify additional opportunities.

DETAILED DESCRIPTION

Figure 1:
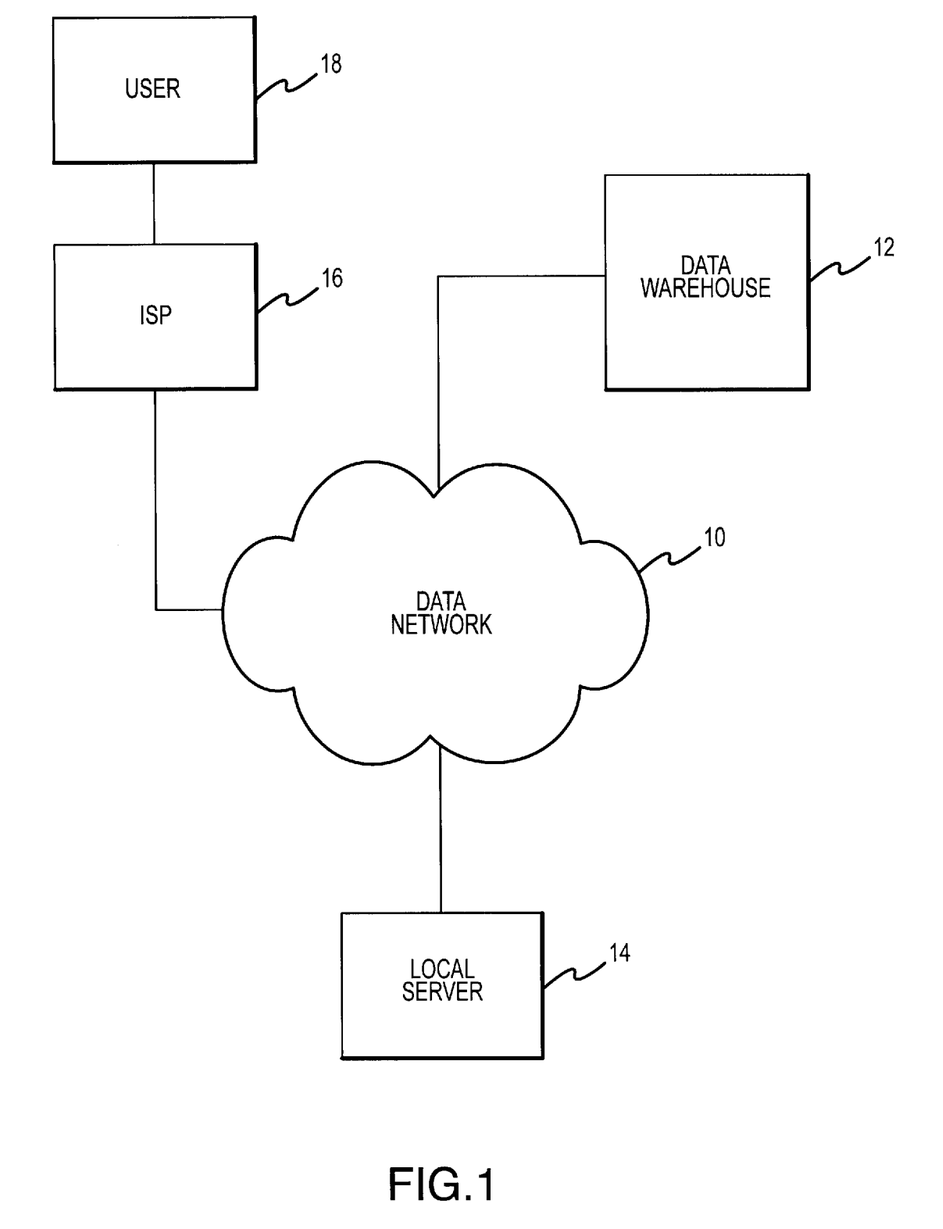
FIG. 1 discloses a network environment within which the system described herein may operate.

Disclosed in FIG. 1 is the system diagram for the data network within which the system described herein may operate. In one configuration, the customer account system may be implemented on a network server 14 which has a connection to the Internet 10. The server may be any of those currently available which support an operating system such as Unix or Microsoft Windows NT. Connections to the network server may be established either through the Internet or the public switch telephone network (PSTN). In the configuration shown here, the network server 14 may establish connections with a corporate data server 12. The data server 12 may be employed by a business to store a variety of information about its clients. The configuration of this data server will be described in greater detail below. As an alternate configuration, the data capabilities of the data server 12 may incorporated in the network server 14.

Connections may also be established to the network server 14 over the data network from a remote computing device 18. In one configuration, a remote computing device is a laptop computer which connects to the Internet through an Internet service provider (ISP) 16. By employing a web browser, the computing device may access the local server 14 and perform processing functions with regards to information stored therein. Alternatively, if the local server 14 is configured to receive telephone inputs directly, the computing device, through use of the modem, may establish a data connection directly with the network server via the PSTN.

Figure 2:
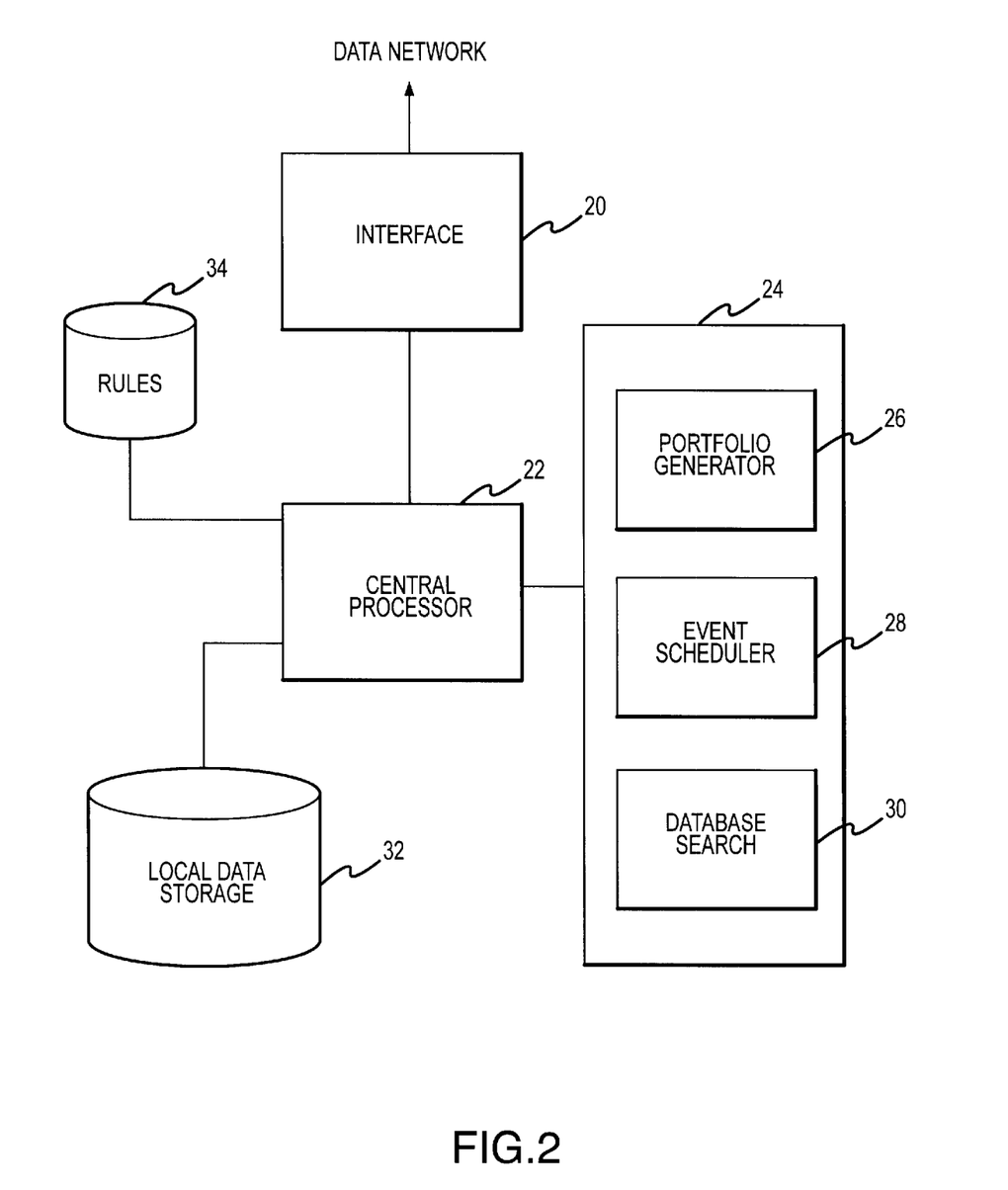
FIG. 2 discloses an internal system diagram for the network server upon which the system is resident.

Disclosed in FIG. 2 is an internal system diagram for the network server upon which the system described herein may be implemented. Connections from the server to data network or PSTN may be provided through interface 20. In short, this interface 20 provides for the receipt and transmission of data signals over the various communications networks. The interface 20 is in connection with central processor 22. Central processor 22 provides for the processing of data and command signals for the network server. In connection with the central processor 22 is Random Access Memory (RAM) 24 which includes a number of processing modules employable to perform the various functions of the system.

Included in RAM 24 is the event scheduler 28, which is a processing module which performs various steps for scheduling the generation of information files, i.e., portfolios. portfolio generator 26 is a processing module which performs the various functions to create the portfolios. The specific content of the portfolios will be described in greater detail below. The last processing module included in the RAM, is the database search module 30. This may be a commercially available software module which is employable to perform searches of databases.

Also in connection with central processor 22 is local database 32. Local database 32 may be used for local storage of information for profiles to be generated. This information may include such things as a listing of users having access to the application, the account modules which a particular user may have access, as well as the location of information in the data warehouse which may be included in the portfolios for a particular customer. Also stored in the database may be the profiles generated by the system. The portfolios may be stored as Java Archive files in the directory structure of the server.

A rules repository 34, which is in connection with central processor 22, may contain rules which are employed by the system described herein to locate particular types of information in a portfolio of interest. For example, if the user of the system described herein is a telecommunications company and the portfolios generated by the system are of customer usage of services or products, certain rules may be employed to locate information about a customer as to types of service which a customer might want.

The above described system may be employed to automatically and simply provide information to remotely located parties which otherwise would require a labor intensive manual search. For example, many times sales representatives when visiting their customers wish to provide information as to the current status of the customer's current accounts with the service or products provider. While the company may posses all the relevant information, it may not be all located in one place. In a typical data warehouse, current billings for a customer may be located in one table, while information on types of services provided may be located in one or more other tables. In order to provide a customer a consolidated view of its relationship with the company, the representative would have to search all the tables and manually compile the information. This task would then need to be repeated every time updated information is to be provided. The system described herein provides a simplified method for automatically gathering this information and then compiling it in a custom made format. This operation may also be periodically repeated so that the information is current. All that is required of the person seeking the information is that they log in to the network server and download the information.

Figure 3:
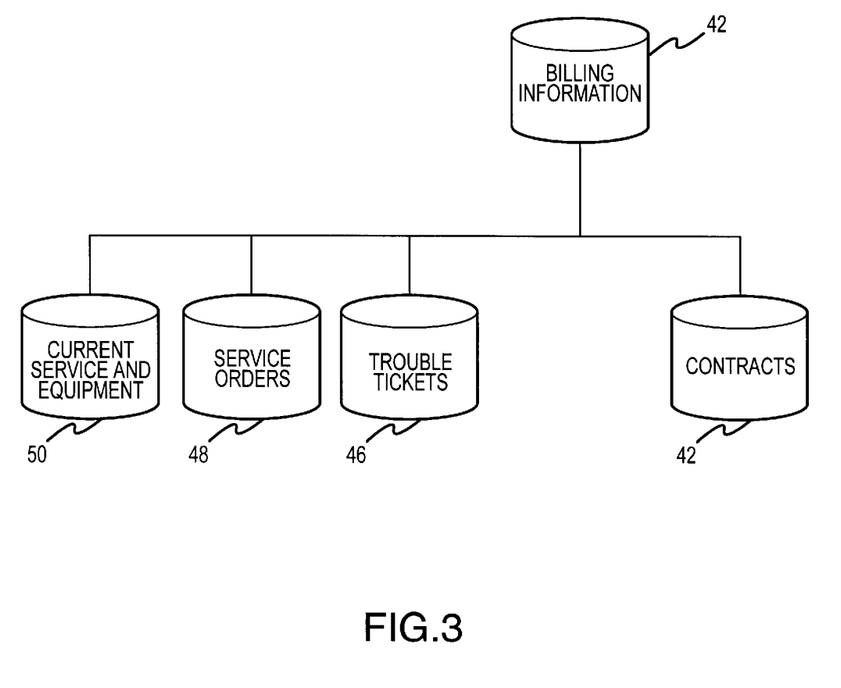
FIG. 3 discloses a configuration for a centralized data warehouse.

As was described above, a company may store much of its financial information in a centralized data warehouse. This warehouse may be comprised of a plurality of data tables which includes business information organized topical manner. Disclosed in FIG. 3 is a minimal example of a data structure which a telecommunications company may employ when providing telephony services. As can be seen, various tables are included in the warehouse. Each table contains a different type of information related to the provision of telephony services. As an example, table 42 includes a listing of all customers including the billing over a particular amount of time. This table may also include a more itemized listing of the charges against a particular telephone number or location. Included in data table 44 may be a listing of current contracts which customers may have with the service or product provider. Through a search of these contracts, particular terms or services which are to be provided for a particular location may be identified.

Data table 46 contains trouble tickets which a customer has submitted and have been associated with a particular account. These trouble ticket entries may have additional information associated with them with regard to type of trouble and whether or not action was taken. Further, a service order's data table 48 may include a history for a particular account or location. Finally, data table 50 may include information with regards to the equipment, and/or service a particular customer location is receiving or has received.

Figure 4:
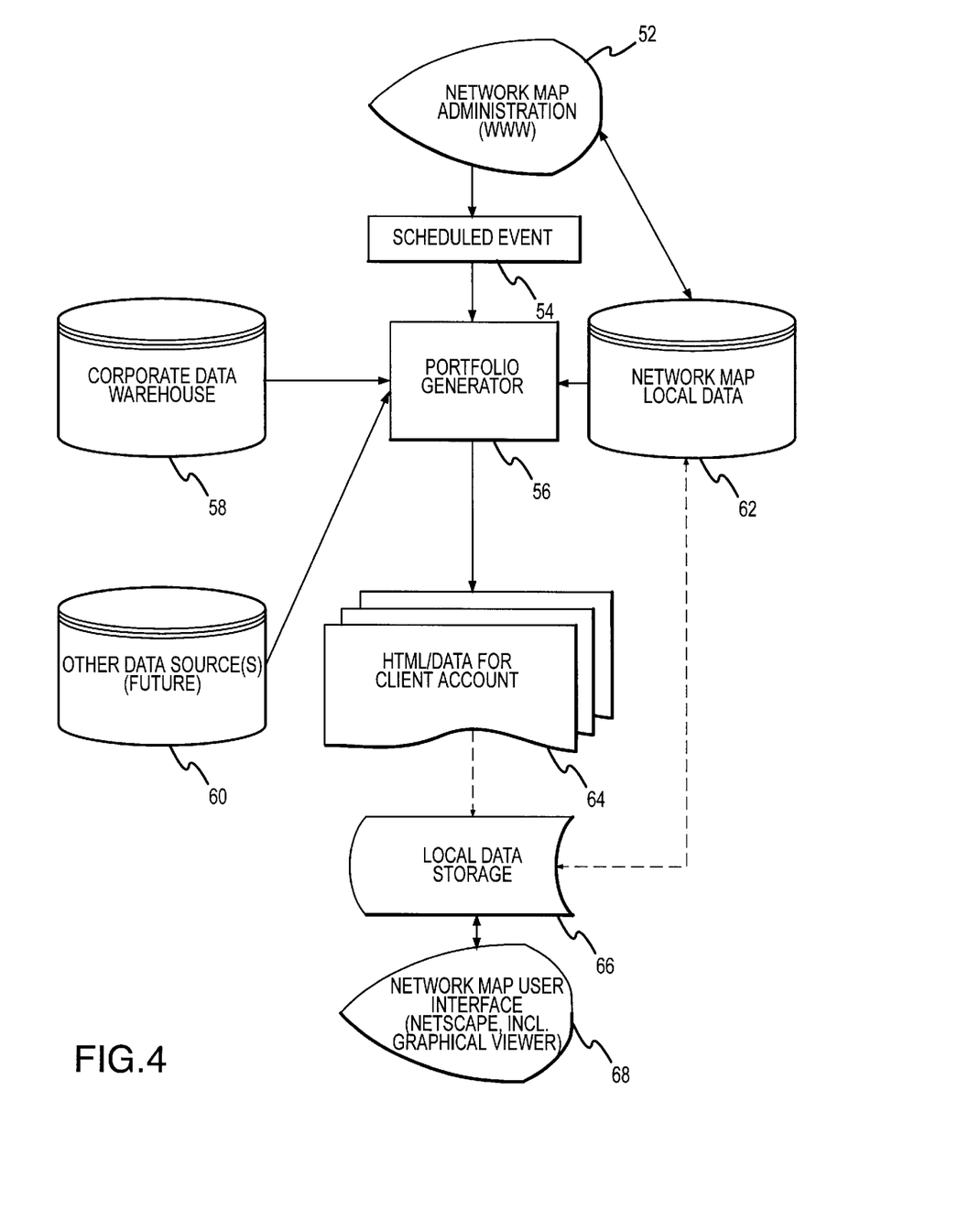
FIG. 4 discloses a system which describes the generation of portfolios.

Disclosed in FIG. 4 is a network map for the system which provides a general description of how the portfolios are generated and accessed. The network map administration 52 resides in memory and provides a local map and instructions for locating data as well as activating particular processing modules. As was mentioned before, the portfolios described herein are generated on a periodic basis and the network map administration contains the schedule 54 for generating such maps at designated times.

Figure 5A:
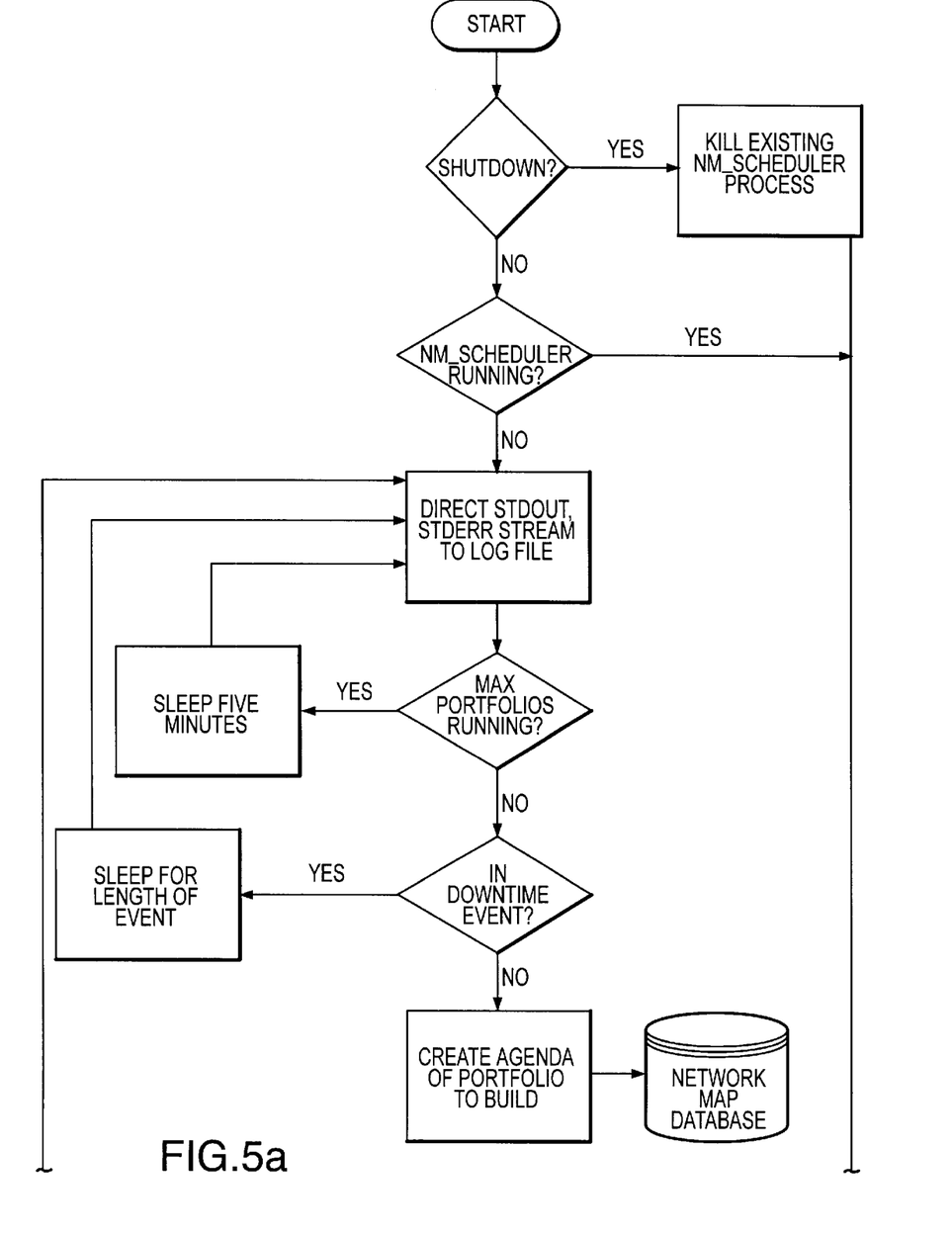
FIGS. 5a and b disclose a flowchart which describes the steps performed in scheduling the generation of portfolios.
Figure 5B:
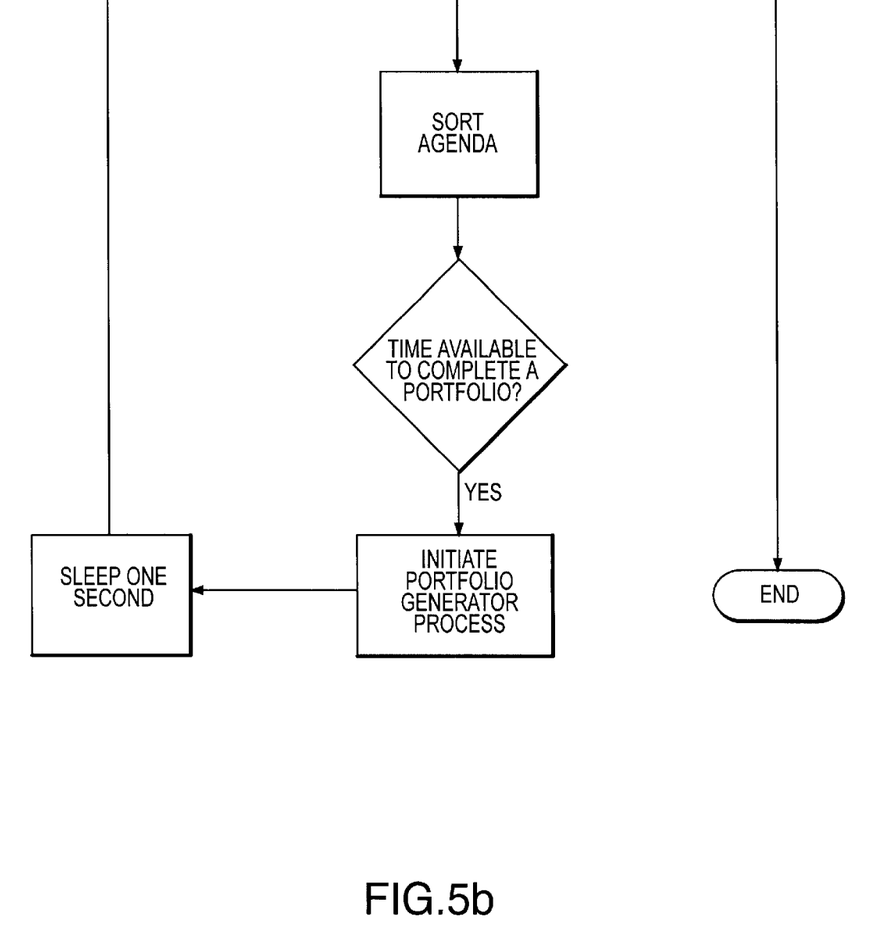

The process for creating a schedule is described in detail in FIGS. 5a and b. According to the flow chart, a number of queries are made initially as to whether the system is to shut down or if the scheduler is already running. If there is a shut down, the system will kill any existing schedule processor and end the process. If the scheduler is already running, the process is also ended. If the answer to both of the previous queries is no, the schedule processor may then begin a run. In the next step, certain operational information is directed to stream to a log file. A query is then made as to whether the maximum number of portfolios are currently running. The system for scheduling the generation of portfolios may or may not be the same system which performs the generation of portfolios. In the system described herein the scheduler process may always be running, and the portfolio generator invoked concurrently as necessary.

If it is determined that the maximum number of portfolios are running, the system is directed to sleep for five minutes and then an attempt is made to perform the same process. If the maximum number of portfolios is not running, a query is made as to whether the system is in a down-time event where the processes will be re-initiated in the near future. If the system is in a down-time event, the scheduling process is directed to sleep for the duration of that event. Once the event is over, the process is started again.

If the system is not in a down-time event, a command is initiated to create the agenda for building portfolios. At this point, the network map database is accessed to identify the customer accounts from which the portfolios are to be generated. Once this information is accessed, an agenda is automatically created based on some provided criteria. As an example, the system may create an ordered list of portfolios that are older than the current data set. Ordering is based on time to generate the portfolio, with those requiring less time being generated first.

Once the agenda is created, a query is made as to whether there is time available to complete a portfolio. If there is, the portfolio generator is initiated and the portfolio is created. Once the portfolio is created the above described process is then started again.

Figure 6A:
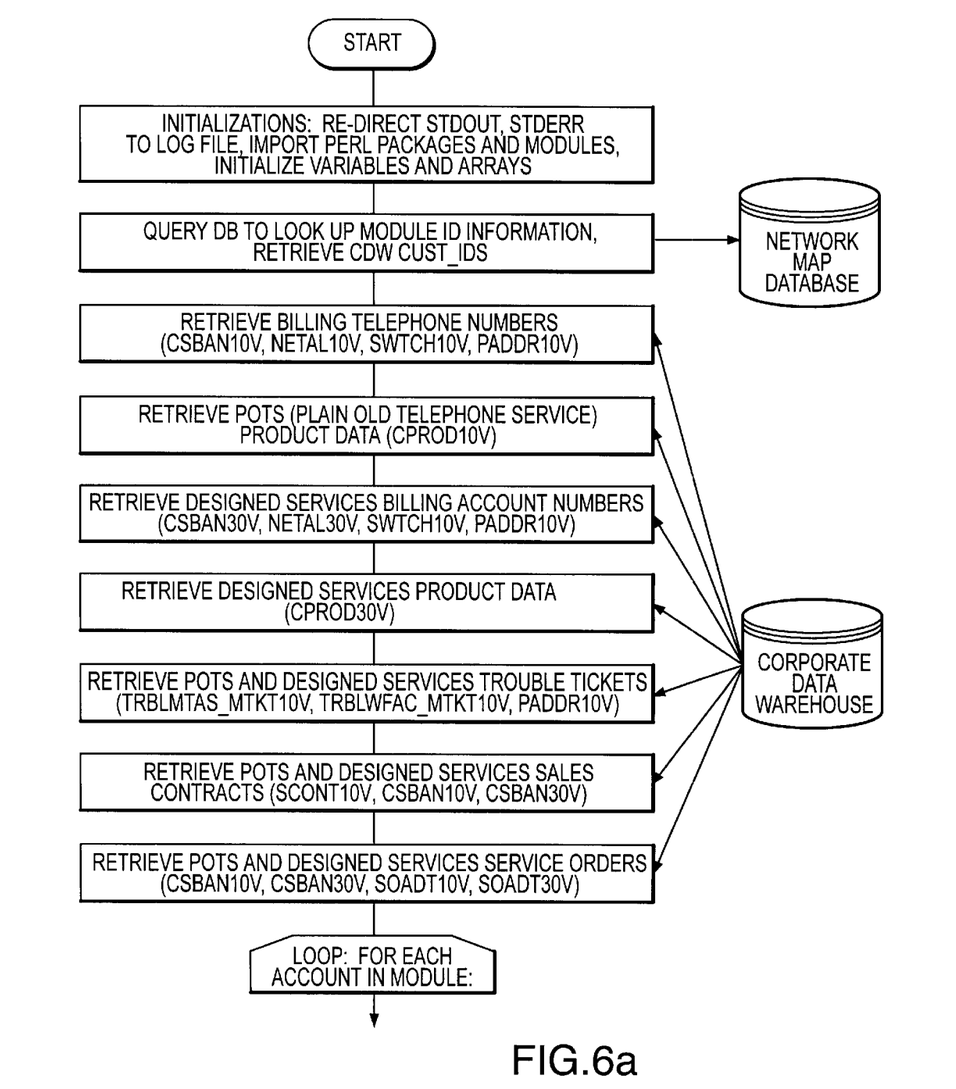
FIGS. 6a and b disclose a flowchart which describes the steps performed in the generation of the portfolio.
Figure 6B:
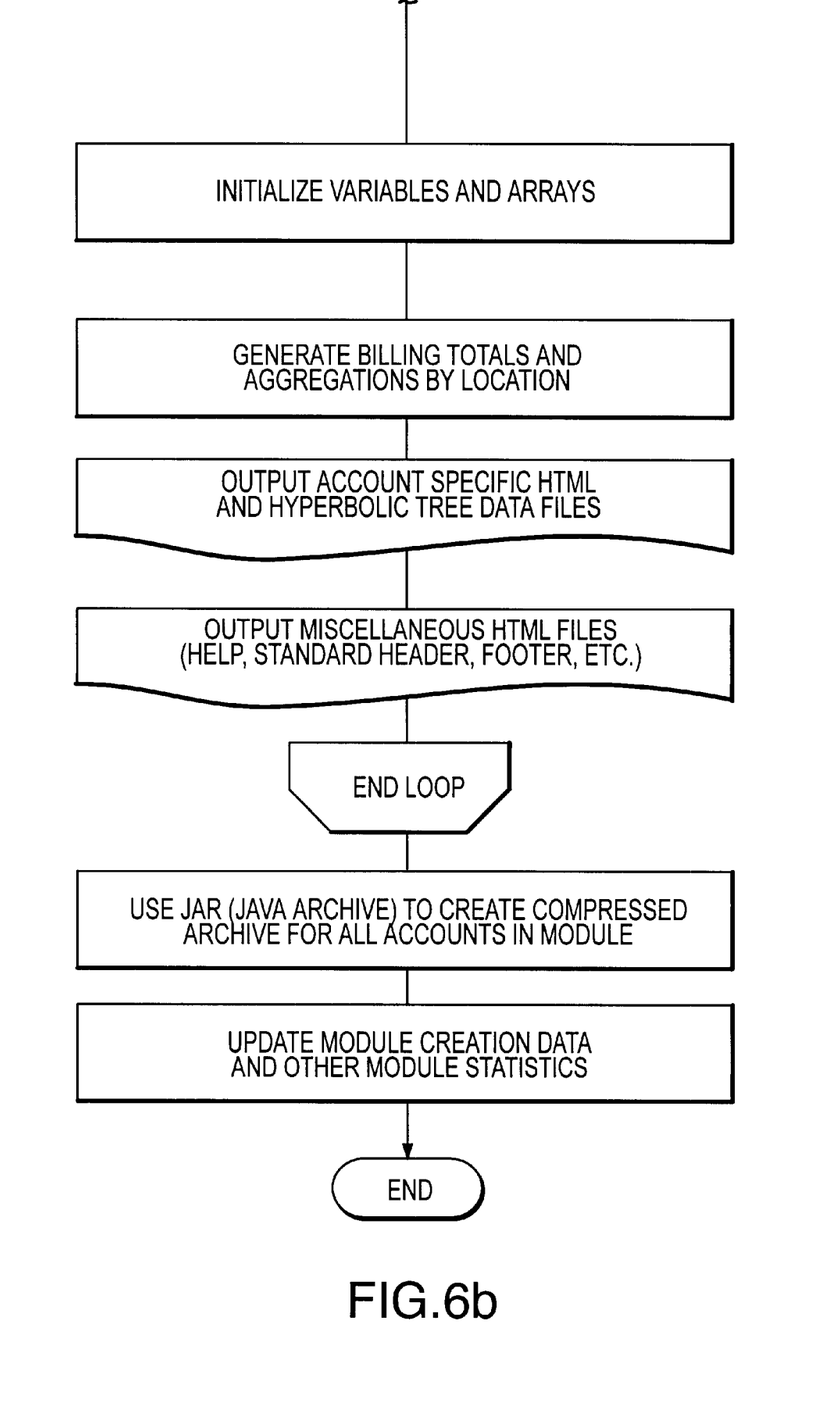

Returning again to FIG. 4, after the agenda is created, the network map administration may begin the processing of a scheduled event, i.e. the generation of portfolios 64 by portfolio generator 56. Disclosed in FIGS. 6a and b are a flow chart which describes in detail the steps performed by the portfolio generator in generating a portfolio. As a first step, initializations are performed which include re-directing the STDOUT and STDERR streams to log file, importing PERL packages and modules, as well as initializing variables and arrays. As a next step, the local database is queried to retrieve information about the customers for which the portfolio is to be generated. The information received includes the location of data files as well as the information which is to be extracted therefrom. In the example disclosed herein, the portfolio generator will be locating and retrieving information from the corporate data warehouse for a customer who is receiving telephony services from a telecommunications company.

After the local information is retrieved, the search of the corporate data warehouse may begin. In the example shown, items retrieved may include the billing telephone numbers for the customer, the plain old telephone service (POTS) product data, the designed service billing accounts numbers, the designed services product data, POTS and designed service trouble tickets, POTS and designed service sales contracts, as well as POTS and designed service orders. Each of these pieces of information may be located in a different data table in the corporate data warehouse. Depending on the number of accounts which are to be included in the portfolio, searches are performed for each of them.

Once the information to be included in the portfolio is identified, the variables and arrays for organizing the information are initialized. As a next step, additional computations may be performed with regard to the information included in the portfolio, such as billing totals and other aggregations for particular locations.

Once all the information is gathered, it may then be output as account specific HTML files and hyperbolic tree data files. The hyperbolic tree technology may be provided by the INXIGHT Corporation, of Palo Alto, Calif., which is a software package which presents data on a display screen in a hyperbolic tree format. The use of this hyperbolic tree format will be described in greater detail below. Once the account specific HTML and hyperbolic tree data files are created, additional miscellaneous HTML files may also be created which include such things as help files, standard headers, footers, etc.

Figure 7:
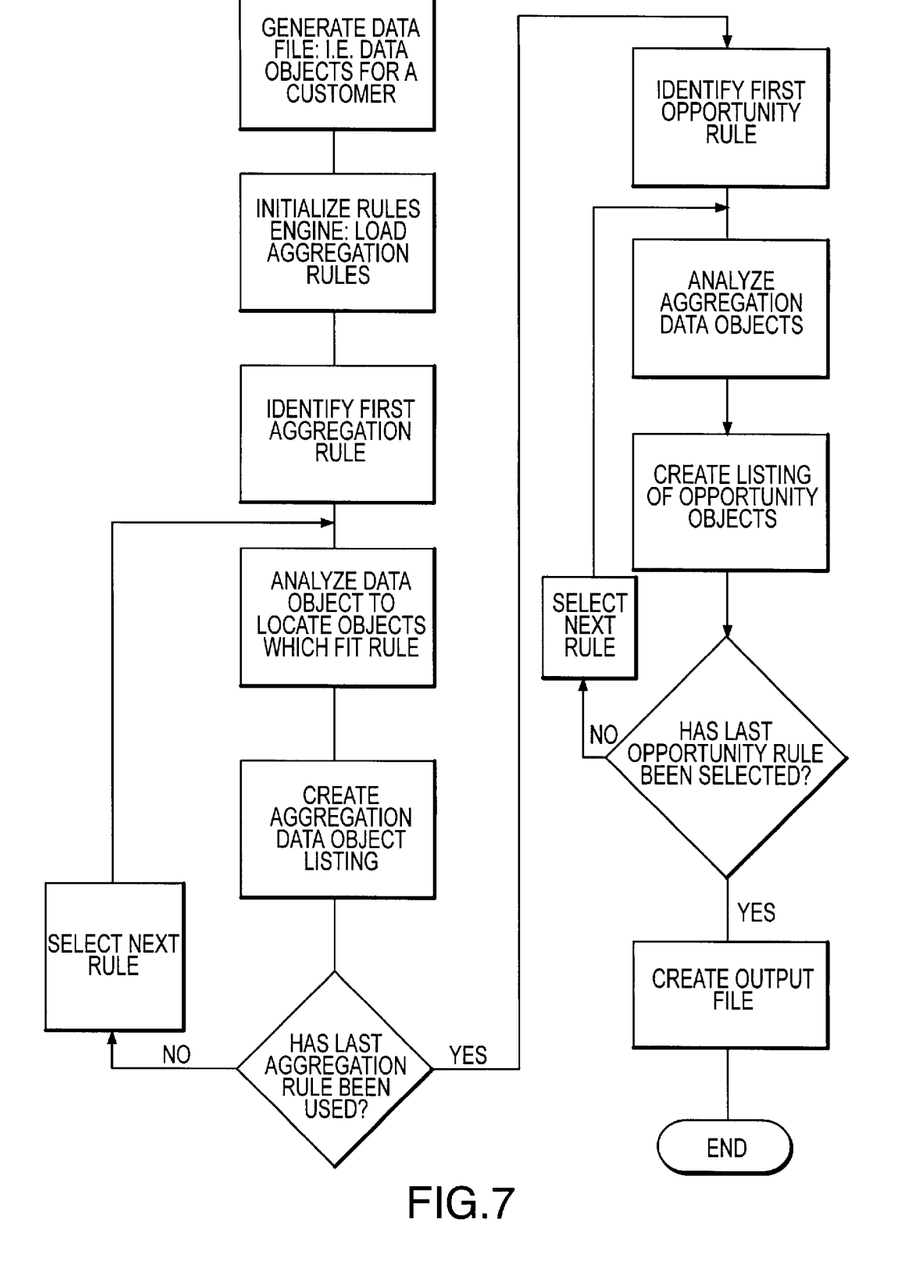
FIG. 7 discloses a flow chart which describes the steps performed in performing a rules analysis of the portfolio information.

An additional step which may be performed is opportunity generation. Opportunities are generated as a result of analysis performed on the data included in the portfolio in order to identify instances where additional products or services may be provided to a customer. Disclosed in FIG. 7 is a flow chart which describes in detail the operations performed in identifying these opportunities.

As a first step, temporary data files are generated which include the data objects for customer which have been retrieved from the corporate data warehouse. Once this data is identified, the rules database is accessed and aggregation rules which have been defined by the business are identified. The first aggregation rule is identified and an analysis is performed to identify all data objects which meet the aggregation rule. A single data object, the result of the aggregation, is created. The system cycles through all the aggregation rules until all objects which satisfy the aggregation rules are identified.

At this point a series of opportunity rules are applied, the first rule is selected and an analysis is begun of the aggregation data objects to identify which objects fall within the opportunity rule. A data object is created for each instantiated opportunity. The system cycles through each opportunity rule until all have been used to analyze the data objects. Once this process is complete, a listing of all opportunity data objects is created and this is included in an HTML file which may be made part of the portfolio which is downloaded by the remotely located users.

Returning again to FIG. 4, once all these output files have been created, the portfolio generation process is ended. The portfolio which has been generated may then be placed in local storage 66 and any tables which need to be updated to indicate the creation date of the portfolio are amended.

Figure 8:
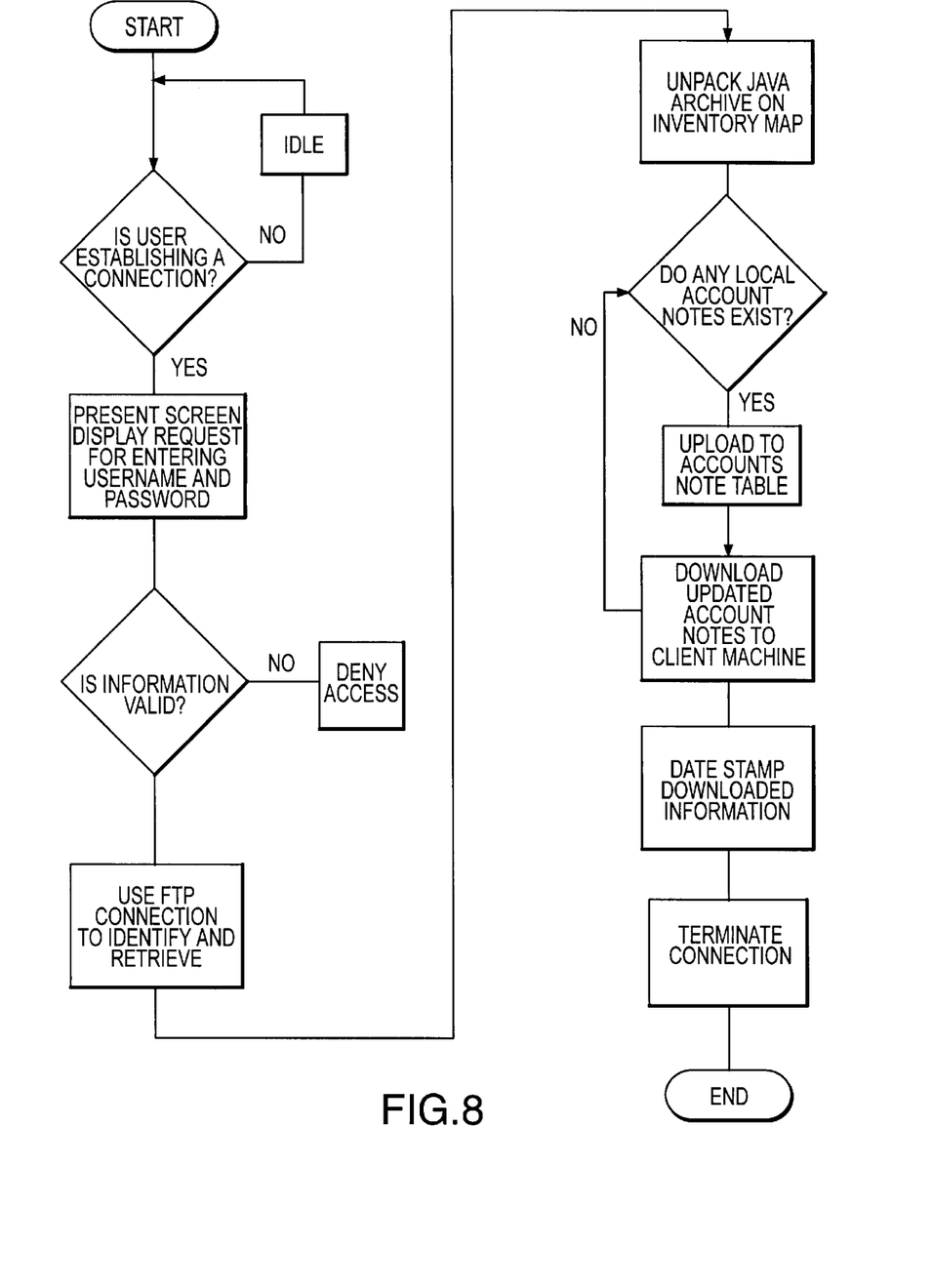
FIG. 8 discloses a flow chart which describes the steps performed in downloading the portfolios to a remote location.

Once the portfolios have been created, they are made available for download by remotely located system users. In most situations, the system user has a personal computer such as a laptop upon which this information may be downloaded. Because the portfolios are created in HTML files, this information may be downloaded and viewed through use of a commercially available web browser. Disclosed in FIG. 8 is a flow chart which describes in detail the steps performed by the system during the download process. As a first step, a query is made as to whether a user is trying to establish a connection with the network server. As was described above, these connections may be established over a data network or over the PSTN. If it is determined that a system user is trying to establish a connection, a screen display is presented through which the system user may enter personal information such as a user name and password. Once this information is entered in the system, a local database may be accessed to determine whether this information is valid or not. If it is determined that the information is not valid, access is denied to the system.

If the information is valid, the system user is granted access to information within the system. As was described above, one of the databases located on the network server include information as to the specific portfolio a system user may have access to. Once the associated portfolio is identified, it is downloaded from the server to the client, in the form of a Java archive. On the client, the JAVA archive is unpacked into the network map directory on the current drive. The download application at this point will check for local account notes and if any exist, they are uploaded to an accounts notes table. Once all this information has been collected, the application will then now download the complete set of account notes via the connection to an accounts notes table on the system user's personal computer. Once this download is complete, the application updates the last download column in the user's table with a current date stamp. This is performed in order to track access to particular files. Once this is complete, the connections with the system user are terminated and the application ends.

At this point, the portfolio is loaded on the local computer for the system user. As such, the primary user interface for viewing the portfolio is a WorldWide Web (WWW) browser. The network map 68 utilizes a frame based display to present an integrated graphical and textual view. The graphical view is implemented as an active hyperbolic tree displaying a geographical hierarchy. An example of the graphical view 70 is provided in FIG. 9. As can be seen, a central node 72 is included for a particular customer and then extending out from that central node are the various states 74 in which addresses use the services or products. By selecting any state and moving it to the center of the display, the entities which connect to the particular state can then be better viewed. In the example shown, each city in which service is provided for a particular customer has a node 76 which is direct connection with the state node 74. The city node then may be moved to the center of the screen and each node which connects directly thereto may be viewed. Double clicking on a service address node provides for the display of an information pane in the display within which various types of information may be included.

Figure 9:
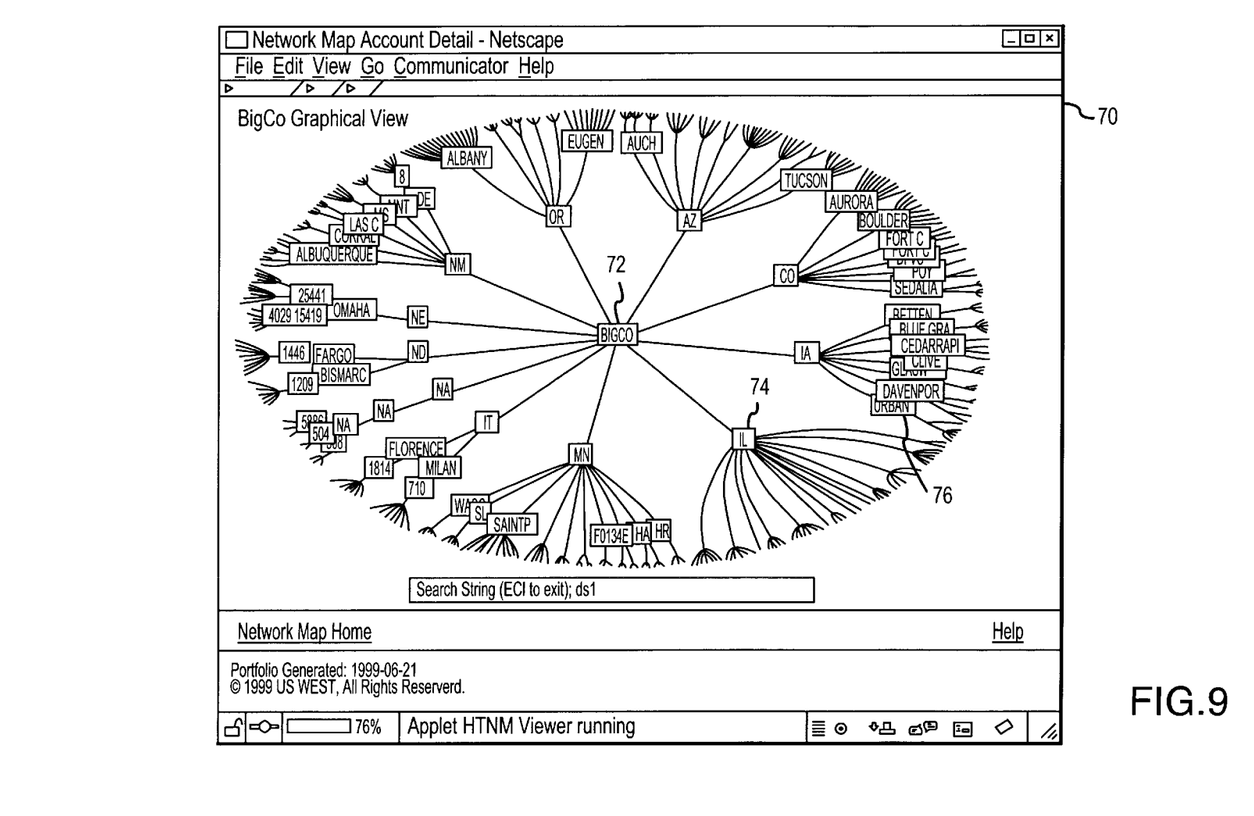
FIG. 9 discloses a screen display which presents the information within a hyperbolic tree.

In the example shown, the layout is alphabetical within each layer, moving clockwise around the radial display. The hierarchy has the following layers from coarse grade to fine grade:
Central customer—name node
States
Cities
Services addresses
Circuit IDs.

When a client tree is rotated, the distances between the nodes change so that the current area of focus appears relatively uncluttered. This is in contrast to a conventional latitude/longitude map where many rural areas might have little data while a metropolitan area may be so densely populated that the data is unintelligible. Also, while it is possible to zoom in on details of a conventional map, the surrounding context is often lost. In the hyperbolic tree display, the context of surrounding parent and child nodes around the node of interest are always visible, and hence the chance of "getting lost in the data" is reduced. Additionally, color may be used to denote levels of hierarchy to help users track where they are.

The tree itself has two purposes. From a navigational perspective, the tree is used to locate the node for a service address of interest. When that service address node is double-clicked, a detailed textual summary appears in another pane of the display. From an informational display perspective, the higher nodes may include cumulative information for all of the associated nodes in the tree. Information "hidden" on each node also facilitates the high-level analysis of the client's products and services, through use of the search/spotlight facility. This facility helps users zero in on specific nodes, particularly useful in large trees of 10,000 or so nodes. One example is for locating a specific service address; another example would be to search on a specific class of service to identify which customers have that service.

Figure 10:
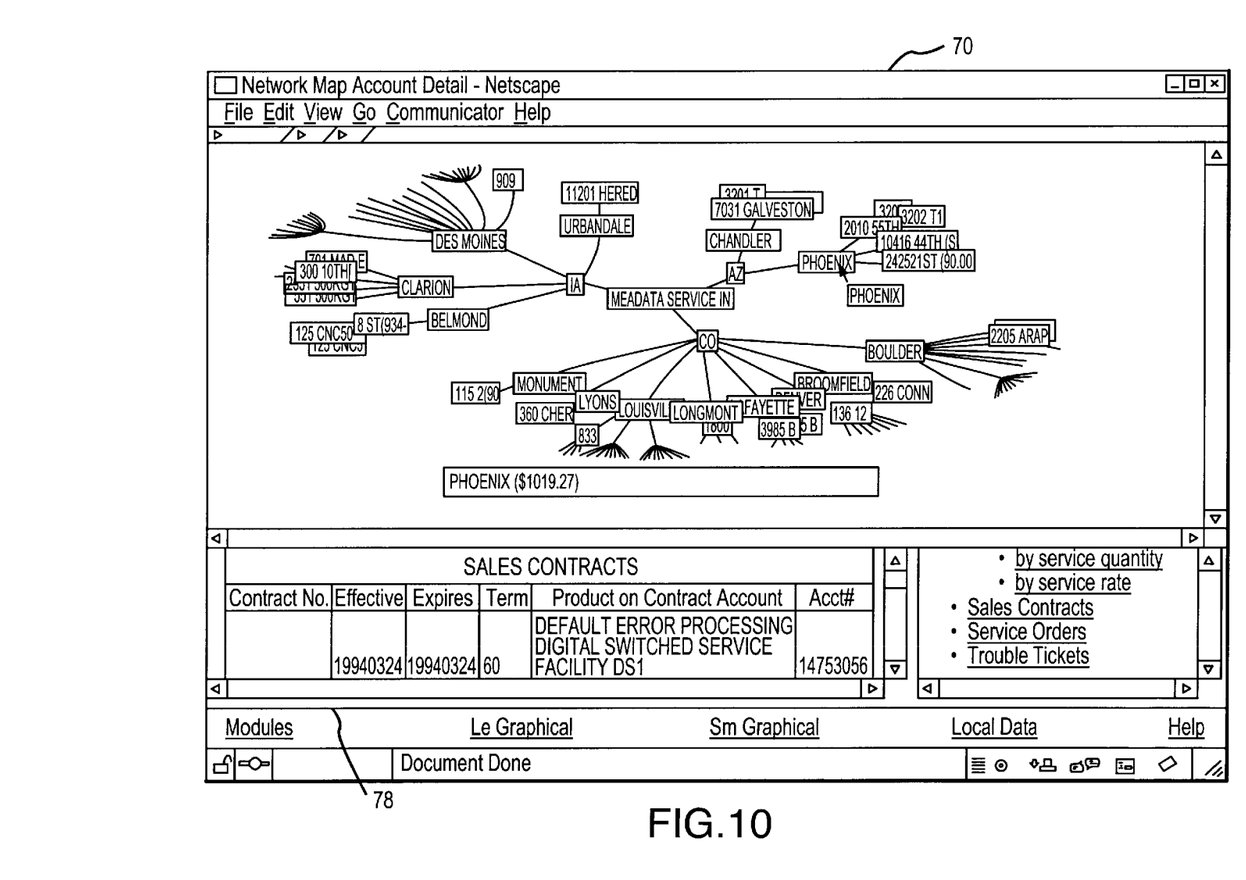
FIG. 10 discloses a screen display which presents a hyperbolic tree along with textual descriptive information.

In the example shown in FIG. 10, an information pane 78 is also included on the display next to the hyperbolic tree information. This pane may display sales contract or other information for a particular node which has been selected by the user. The user may also select other topical headings such as service orders or trouble tickets for a particular node. These sources of information are available all the way down to the lowest hierarchical levels in the hyperbolic tree. Additional windows may also disclose the rules based analysis disclosed above, in order to identify particular addresses which may be candidates for additional services or products.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described above are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A system for providing customized account information to remotely located parties comprising:
   a first database which contains data which includes account information;
   a second database which includes account information relating to particular accounts, wherein the account information is employable to access data in the first database and to restrict access to the customized account information for each of the particular accounts;
   a rules repository within which are stored a plurality of aggregation rules and a plurality of opportunity rules;
   a scheduler configured to periodically schedule generation of a plurality portfolios which include account information;
   a portfolio generator configured to automatically perform a search of the first and second databases to generate the plurality of portfolios in a periodic fashion according to a schedule provided by the scheduler, where the portfolio includes compiled portions of the account information for each account, and the plurality of aggregation rules are further employed by the portfolio generator to identify selected data objects in the account information;
   the portfolio generator being further configured to determine if any of the selected data objects fall within one of more of the plurality of opportunity rules and identifying opportunity data objects,
   the portfolio generator being further configured and to store the portfolios in a location accessible over a data network; and
   an external interface employable to access and download the portfolios over a data network.

2. The system of claim 1 wherein the data network is the Internet.

3. The system of claim 2 wherein the portfolio generator is configured on a network server.

4. The system of claim 1 wherein the account information relates to telecommunications services.

5. The system of claim 4 wherein the first database is a corporate database which includes specific account information for customers in a plurality of different data tables.

6. The system of claim 5 wherein the second database includes at least one of: accounts which are to be profiled, users which have access to the accounts, and account modules to which particular user have access.

7. The system of claim 5 wherein the portfolio generator compiles information received from the corporate database in a hierarchical structure according to predetermined format.

8. The system of claim 7 wherein the predetermined format is geographical.

9. The system of claim 1 wherein the portfolios generated are downloadable through the external interface to a local database.

10. The system of claim 9 wherein the information is presentable on a personal computer with a web browser where the information is presented in a screen display in a hierarchical structure.

11. The system of claim 10 wherein the hierarchical structure is a node based structure through which a plurality of levels of information may be viewed.

12. The system of claim 1 wherein the portfolios are presentable as a hyperbolic tree, and the data objects are configured in multiple HTML documents, all of which are viewable through use of a web browser.

* * * * *